June 26, 1934.  J. H. BANINGER  1,964,420
BEARING MOUNTING
Filed June 5, 1929
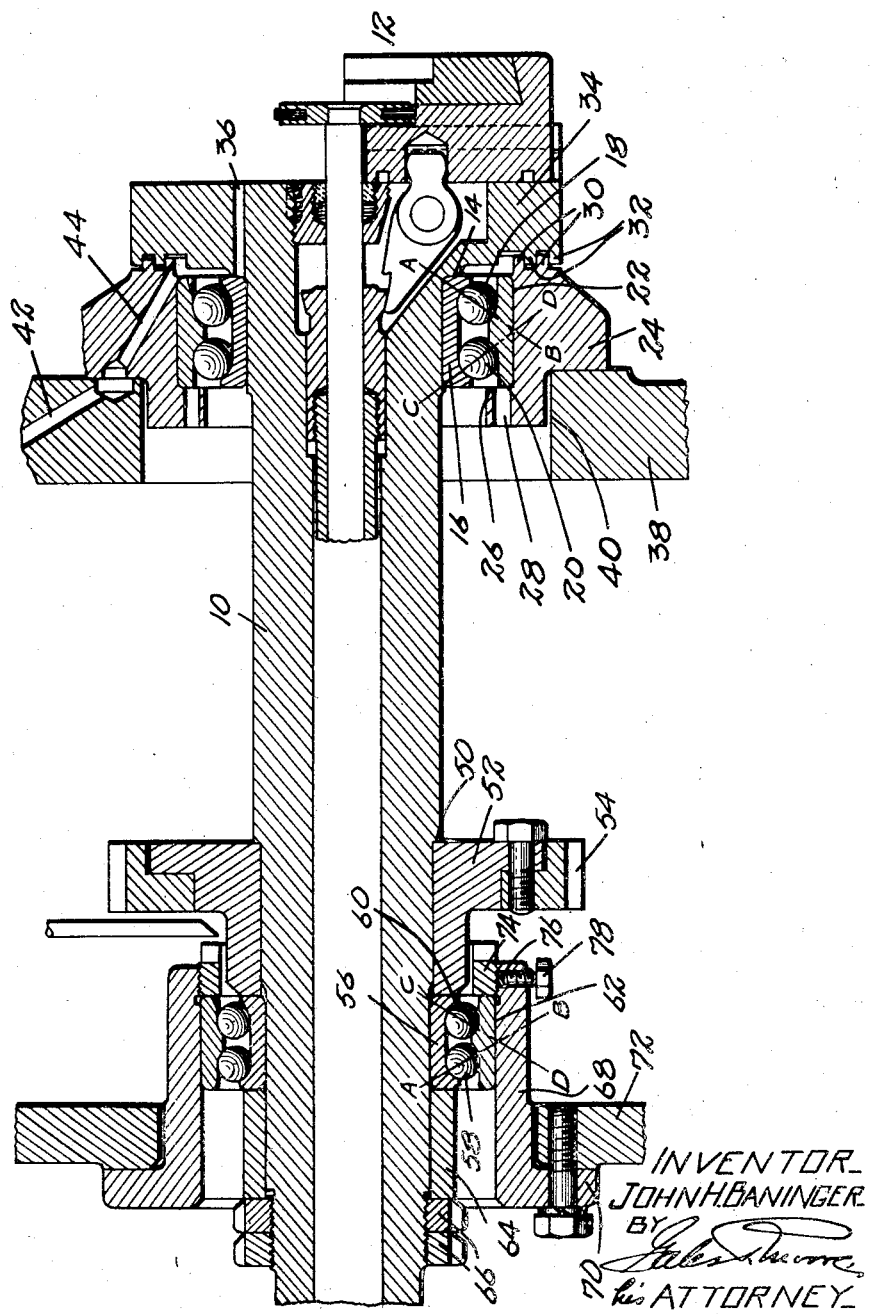
INVENTOR
JOHN H. BANINGER
BY
his ATTORNEY Patented June 26, 1934

1,964,420

UNITED STATES PATENT OFFICE 1,964,420

BEARING MOUNTING

John H. Baninger, Bristol, Conn., assignor, by mesne assignments, to General Motors Corporation, Detroit, Mich., a corporation of Delaware Application June 5, 1929, Serial No. 368,507

10 Claims. (Cl. 308—189)

This invention relates to bearing mountings and comprises all the features of novelty herein disclosed.

An object of the invention is to provide a shaft mounting wherein a plurality of cooperating double row antifriction bearings are initially preloaded internally to promote true running without play or vibration in spite of external loads which change the initial load. Another object is to provide a shaft and bearing combination wherein a pair of anti-friction bearings which are initially preloaded internally in themselves are capable also of an external adjustment to counteract or compensate for any change in preloading that may occur, such as that due to external load. Another object is to provide a bearing mounting wherein play between a relatively rotatable shaft and a casing, due to thrust and radial load, is prevented by internal loads built into the bearings themselves independently of stresses on the shaft. To these ends and to improve generally and in detail upon devices of this character, the invention consists in the various matters hereinafter described and claimed.

In its broader aspects, the invention is not necessarily limited to the specific construction selected for illustration in the accompanying drawing in which The figure is a central longitudinal section of a shaft and its improved bearing mounted.

The numeral 10 indicates a shaft such as that of a lathe spindle having any suitable chuck or work holding means indicated generally at 12. The shaft has a shoulder or flange 14 abutting against an inner race ring 16 of a double row bearing herein shown as a ball bearing having two rows of balls 18 and 20 and an outer race ring 22 which is preferably driven into a bore of a bearing housing 24 against a shoulder or flange 26. Openings 28 in the flange provide for insertion of a tool for removing the bearing. The inner race ring has ball raceways facing one another and the outer race ring has ball races facing away from each other to provide a thrust and radial load bearing wherein the angles of contact are along the lines A—B and C—D. Furthermore, the balls in each row are given an initial preloading which places them under compression in the direction of the angular contact lines. This initial preloading occurs in the assembly and can be predetermined by careful attention to size of the parts. One row of balls is preferably inserted by a relative axial displacement of the rings and the second row by forcing the balls through filling notches when the outer race ring is expanded.

The bearing housing 24 has axial flanges or circular ribs 30 interfitting with similar flanges or ribs 32 on a collar 34 to retain lubricant and exclude foreign matter. The collar 34 has one or more openings 36 to provide for removal of the inner race ring 16 which preferably has a drive fit on the shaft. The housing 24 is secured to the face of a frame or casing 38 and has a part entering a bore 40 of the casing. Communicating ports 42 and 44 in the frame and housing form a passage for conducting lubricant to the bearing.

The shaft has a shoulder 50 abutting against a ring 52 carrying a drive gear 54 and the ring abuts against an inner race ring 56 of a double row bearing having rows of balls 58 and 60 and an outer race ring 62. This bearing may be identical with the other bearing and likewise has the balls preloaded initially for compression in the direction of the angular contact lines A—B and C—D. The inner race ring is secured fixedly on the shaft by a sleeve 64 and clamping nuts 66. The outer race ring preferably has a tight push fit in the bore of a bearing housing 68 and has no axial movement under working load. The housing 68 has a flange 70 fastened to the face of a frame or casing member 72 which is rigid with or a part of the casing 38 and has a bore concentric with the bore 40. A nut 74 is threaded in one end of the housing to engage the outer race ring 62. When desired, the nut can be turned to force the race ring to the left in the figure, a soft metal shoe 76 and set screw 78 serving to lock the nut in adjusted position.

With both of the bearings made with an initial preloading of the rows of balls, an extraneous axial load on the shaft, such as that due to cutting tool pressure exerted to the left for instance, will increase the compression or load on the ball rows 18 and 60 and decrease it on the remaining ball rows. Some of the initial load on the ball rows 20 and 58 will remain, however, and so keep the balls pressed against their raceways in a manner to avoid play or vibration of the shaft. This result is obtained by the internal load built into the bearing and is independent of shaft expansion, springs or other pressure applying means which exert tension or other stresses on the shaft. Should the extraneous load be of sufficient magnitude to remove all the initial load from the ball rows 20 and 58, or if this removal occurs for any other reason, compensation can be effected by turning the nut 74. An adjustment of the race ring 62 to the left will increase the initial load on the ball row 58 and decrease it on the ball row 60 and when the extraneous load is applied, the resulting angular pressures on the two ball rows are or may be equalized and the spindle continues to run true and without play or wobble. The benefits of the invention are applicable to a rotary housing supported for rotation on a fixed shaft.

I claim:

1. In a bearing mounting for thrust and radial load, a casing and a shaft mounted for relative rotation on spaced double row bearings, each bearing comprising an inner race ring, an outer race ring and a plurality of rows of rolling elements, the inner race ring of each bearing being fixed with respect to the shaft and the outer race ring of each bearing being fixed with respect to the casing, and each bearing having its co-operating raceways closer together than the normal diameter of the rolling elements whereby the two rows of rolling elements are initially preloaded or compressed along oppositely inclined contact lines by the internal structure of the bearing itself to maintain angular pressure contact of both rows of rolling elements with their raceways when extraneous load changes the initial load on the rolling elements; substantially as described.

2. In a bearing mounting for thrust and radial load, a casing and a shaft mounted for relative rotation on spaced double row bearings, each bearing comprising an inner race ring, an outer race ring and a plurality of rows of rolling elements, the inner race ring of each bearing being fixed with respect to the shaft and the outer race ring of each bearing being fixed with respect to the casing, each bearing having its co-operating raceways closer together than the normal diameter of the rolling elements whereby the two rows of rolling elements are initially preloaded or compressed along oppositely inclined contact lines by the internal structure of the bearing itself, and an adjusting member for forcing one of the race rings of one bearing axially with respect to the other race rings to increase the angular contact pressure of one row of rolling elements and decrease that of the adjacent row to thereby tend to equalize said contact pressures under an extraneous load; substantially as described.

3. In a bearing mounting for thrust and radial load, a casing and a shaft mounted for relative rotation on spaced antifriction bearings of angular contact type, each bearing comprising an inner race ring and an outer race ring, the inner race ring of each bearing being fixed with respect to the shaft and the outer race ring of each bearing being fixed with respect to the casing, at least one of the bearings being a double row with its co-operating raceways closer together than the normal diameter of the rolling elements whereby the two rows of rolling elements are initially preloaded or compressed along oppositely inclined contact lines by the internal structure of the bearing itself to maintain angular pressure contact of both rows of rolling elements with their raceways when extraneous load changes the initial load, and an adjusting member for forcing one of the race rings of one bearing axially with respect to the other race rings to increase the angular contact pressure of one row of rolling elements of the double row bearing and decrease that of the adjacent row to thereby tend to equalize the angular contact pressures under an extraneous load; substantially as described.

4. In a bearing mounting for thrust and radial load, a casing and a shaft mounted for relative rotation on spaced antifriction bearings of angular contact type, each bearing comprising an inner race ring and an outer race ring, the inner race ring of each bearing being fixed with respect to the shaft and the outer race ring of each bearing being fixed with respect to the casing, at least one of the bearings being a double row with its co-operating raceways closer together than the normal diameter of the rolling elements whereby the two rows of rolling elements are initially preloaded or compressed along oppositely inclined contact lines by the internal structure of the bearing itself to maintain angular pressure contact of both rows of rolling elements with their raceways when extraneous load changes the initial load; substantially as described.

5. In a bearing mounting, a casing having bores, bearing housings secured to the casing at the bores, a shaft extending through the bearing housings, antifriction bearings between the shaft and the bearing housings, each bearing comprising an inner race ring and an outer race ring, the inner race ring of each bearing being fixed with respect to the shaft and the outer race ring of each bearing being fixed with respect to its bearing housing, at least one of the bearings being a double row with its co-operating raceways closer together than the normal diameter of the rolling elements whereby the rows of rolling elements are initially preloaded along oppositely inclined contact lines by the internal structure of the bearing itself, and means external to the bearing for varying the initial load on the two rows of rolling elements; substantially as described.

6. In a bearing mounting, a shaft, a casing, a pair of axially spaced bearings between the shaft and the casing, each bearing comprising an inner race ring, an outer race ring and a series of rolling elements, at least one of the bearings being a unit-handling double row with one-piece race rings, each outer raceway being closer to its inner raceway than the diameter of the rolling elements to hold the rolling elements under a positive compression, and the outer raceways being angular contact to cause one row of rolling elements to react on the other; substantially as described.

7. In a bearing mounting, a shaft, a casing, a pair of axially spaced bearings between the shaft and the casing, at least one of the bearings comprising an outer race ring, an inner race ring and a series of rolling elements, the race rings of the said one bearing having co-operating angular contact raceways which themselves hold the rolling elements under a positive initial compression, and an adjusting member for thereafter forcing one of the race rings axially with respect to the other to maintain a compression of the rolling elements upon the application of external load; substantially as described.

8. In a bearing mounting, a shaft subject to external thrust and radial load, a casing, spaced apart preloaded bearings between the shaft and the casing, at least one bearing being a double row bearing with its two series of rolling elements held by the races themselves under opposed and balanced angular contact reload, and means for forcing one of the race rings and its raceways of the double row bearing axially with respect to the other race ring and its raceways to equalize the load on the two series of opposed rolling elements when the external load changes the initial condition of balance; substantially as described.

9. In a bearing mounting, a shaft subject to external thrust and radial load, a casing, a pair of spaced-apart bearings between the shaft and the casing, at least one of the bearings being a double row bearing with its two series of rolling elements held by the races themselves under angular contact preload, the other bearing having its race rings held from axial movement to resist external thrust load, the outer race ring of the double row bearing being normally held by the casing from axial movement with respect to the other bearing, and means for bodily forcing such outer race ring of the double row bearing axially in the casing to decrease the load on one of its rows of rolling elements and to increase the load on the other row; substantially as described.

10. In a bearing mounting, a shaft subject to external thrust and radial load, a casing, a pair of spaced apart bearings between the shaft and the casing, at least one of the bearings being a double row bearing with its two series of rolling elements held by the races themselves under angular contact preload, the other bearing having its race rings held from axial movement to resist external thrust load, the outer race ring of the double row bearing being fitted tightly in the casing to resist a normal thrust load, and means threaded in the casing for bodily forcing such outer race ring axially with respect to the shaft; substantially as described.

JOHN H. BANINGER.

CERTIFICATE OF CORRECTION.

Patent No. 1,964,420.                                             June 26, 1934.

JOHN H. BANINGER.

It is hereby certified that error appears in the printed specification of the above numbered patent requiring correction as follows: Page 1, line 30, for "mounted" read mounting; page 2, line 142, claim 8, for "reload" read preload; and that the said Letters Patent should be read with these corrections therein that the same may conform to the record of the case in the Patent Office.

Signed and sealed this 7th day of August, A. D. 1934.

Leslie Frazer (Seal)                                                Acting Commissioner of Patents.